INVENTORS
David D. Campbell,
James D. Leslie, &
James H. Wernig
BY
Herbert Furman
ATTORNEY

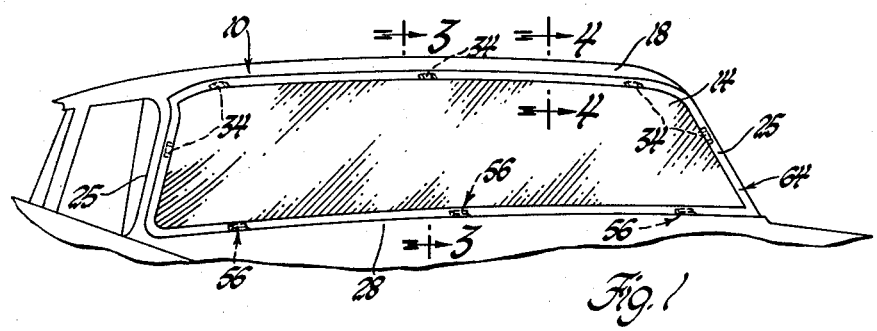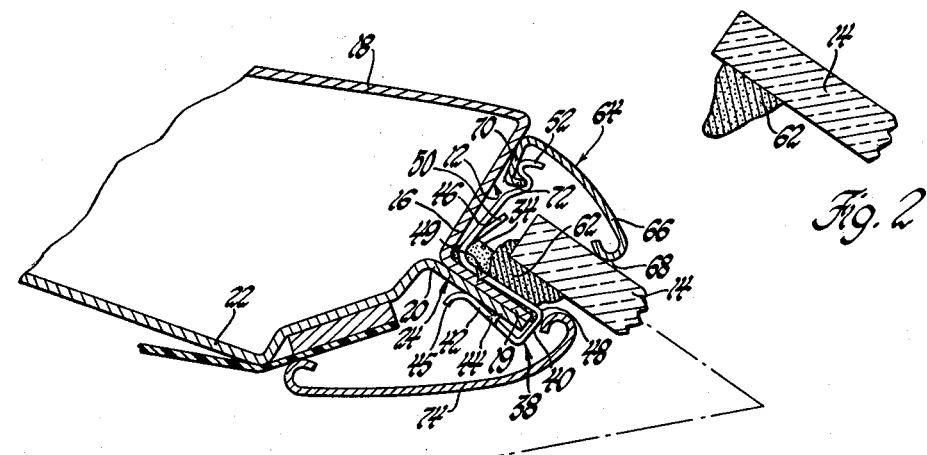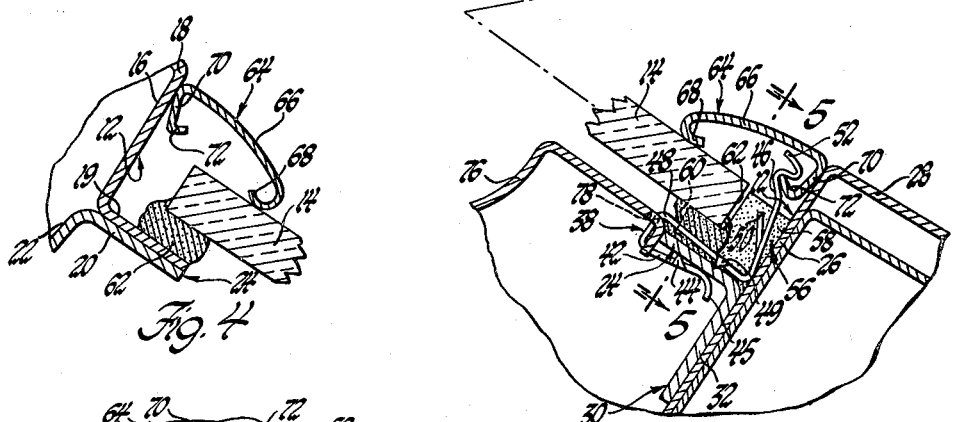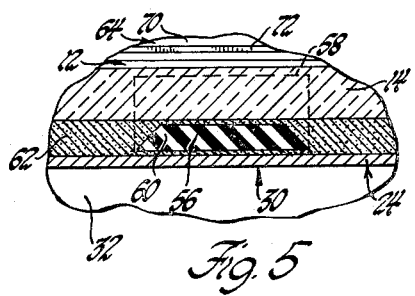

United States Patent Office 3,155,422
Patented Nov. 3, 1964

3,155,422
WINDSHIELD MOUNTING
David D. Campbell, James D. Leslie, and James H. Wernig, all of Birmingham, Mich., assignors to General Motors Corporation, Detroit, Mich., a corporation of Delaware
Filed Nov. 6, 1961, Ser. No. 150,299
5 Claims. (Cl. 296—93)

This invention relates to vehicle bodies and more particularly to the mounting of transparent panels such as windshields or backlights on vehicle bodies.

At the present time, fixed vehicle windows, such as windshields or backlights, are mounted on the body by means of weatherstrips having oppositely opening continuous channels, one of which receives the edge portion of the window and the other of which receives the body flange extending generally parallel to the plane of the body window opening and generally normal to the body wall which defines the window opening. This manner of mounting fixed vehicle windows on bodies has been widely used for many years.

However, such a manner of mounting fixed vehicle windows on bodies presents certain problems with regard to sealing of the body against the entry of moisture. Although the body flange is generally continuous, this flange is comprised of a number of body parts and accordingly various portions of the flange may be out of line with adjacent portions due to production variations so as to tend to twist or distort the weatherstrip and thereby increase the possibility of moisture entry into the body along the body wall and over the flange. Further, with the advent of the wrap-around type windshield, the sealing problems are increased due the multiple curvature of the body flange and of the glass.

This invention provides an improved manner of mounting transparent panels on vehicle bodies which is easily adapted to modern-day automobile body production methods and which virtually insures there will be no moisture leakage into the body. Further, the subject manner of mounting windshields and backlights is interchangeable at will with the usual present practice since no change need be made in the body structure or in the manner in which the various parts of the body which make up the window opening are secured together.

In the preferred embodiment of the invention, a plurality of first spacer members, preferably of rubber or similar resilient material, are adhesively secured to the body flange along the side edge portions and the top edge portion of the window opening. These spacer members are generally of isosceles trapezoidal cross section. Along the bottom edge portion of the windshield opening, a plurality of second generally L-shaped spacer members have one leg thereof adhesively secured to the body wall defining the windshield opening and the other leg thereof adhesively secured to the body flange. The other leg of the second spacer members is of the same cross sectional shape as the first spacer members.

A plurality of clips are secured to the body flange intermediate the spacer members. Each clip includes a generally channel-shaped mounting portion which receives the body flange therein, being adhesively sealed thereto, and a generally laterally extending leg which extends outwardly along the body wall for attachment to the outer body garnish molding to mount the molding on the body.

The windshield or backlight panel is first provided with a bead of curable adhesive material on the inner surface thereof adjacent the edge thereof. This bead is generally of triangular cross section. The panel is then located, by means of a suitable fixture, generally angularly to the plane of the window opening, with its lower edge portion resting on the one leg of the second spacer members. The panel is thereafter rotated inwardly of the opening so as to bring the bead of adhesive material into engagement with the first spacer members, the other legs of the second spacer members, the body flange, and the mounting portions of the clips. By having the first spacer members and the other legs of the second spacer members of trapezoidal cross section, the adhesive material on the panel will flow continuously around the spacer members without any voids, such as would result if these members were of rectangular or square cross section. Further, by applying a bead of adhesive material of triangular cross section to the panel, the bead will take up any and all production variations in the body opening and panel.

Thereafter, the adhesive material is cured so as to rigidly secure the panel to the body flange, to the spacer members, and to the clips. The adhesive material, once cured, has several of the properties of rubber, one of which is limited flexibility, which allows the panel to move relative to the body flange as the cured adhesive material acts in shear. Tests conducted on a vehicle body having a windshield mounted thereon in a manner according to this invention has indicated significant increases in body rigidity as well as a substantial decrease in windshield opening distortion such as caused by bending and torsional body moments. Thus, in effect, the panel becomes a load carrying part of the vehicle body, although it can still move relative thereto within a limited extent. This is one of the advantages obtained through use of the subject invention. Of course, the elimination of sealing problems by providing a continuous barrier and seal between the panel and the body opening by means of the bead of cured adhesive material is a primary advantage.

A rotative type outer reveal molding of generally L-shaped cross section has one leg thereof secured to the body by the lateral legs of the clips so as to rotate the other leg thereof into tight fitting engagement with the panel to conceal the clips, the spacers and the adhesive material from view from the exterior of the body. The usual inner garnish moldings conceal the body flange, the spacer members, the clips, and the adhesive material from view from the interior of the body.

The improved manner of mounting transparent panels on vehicle bodies provided by this invention has several distinct and important advantages over present day practices. One advantage is in the elimination of glass panel strain breaks by permitting the custom installation of each individual transparent panel to each individual body opening regardless of the production tolerances and variations of either the panel or the body opening. This is important in the mass production of vehicle bodies. Such custom installation avoids localized stresses in the panel which often lead to glass breakage problems and resultant required replacement of the panel. The warrantly cost to the manufacturer and costs to the operator of the vehicle are thus reduced to a minimum. Another advantage is in the sealing of the entire periphery of the glass to the body opening to virtually negate the possibility of water leaks. Additional sealing operations, such as the applying of various sealers within the channels of present day weatherstrips, are also eliminated. A further advantage is in the reduction of both material costs and installation time as compared to present day practices and materials. Yet another advantage is in service replacement of the panel. Any replacement panel will also be custom fitted to the body opening regardless of the production variations of the replacement panel and of the body opening. The ease of installation reduces the replacement time to a minimum while water leakage problems and additional sealing operations are eliminated as hereinbefore noted. Yet a further advantage is in the improvement of body appearance due to the fact that the elimination of the present used weatherstrip eliminates various appearance problems which result from portions of the weatherstrips being visible from both the interior and exterior of the body. The weatherstrips are usually colored black and problems are often encountered in concealing the weatherstrips so as to enhance the body appearance.

The primary object of this invention is to provide a new and improved manner of mounting fixed transparent closures on vehicle bodies.

This and other objects of this invention will be readily apparent from the following specification and drawings wherein:

FIGURE 1 is a partial front perspective view of a vehicle body having a windshield mounted thereon in a manner according to this invention;

FIGURE 2 is a cross sectional view of the edge portion of the windshield having a bead of adhesive material applied thereon prior to installation of the windshield on the body;

FIGURE 3 is an enlarged sectional view taken generally along the plane indicated by line 3—3 of FIGURE 1;

FIGURE 4 is an enlarged sectional view taken generally along the plane indicated by line 4—4 of FIGURE 1;

FIGURE 5 is a view taken generally along the plane indicated by line 5—5 of FIGURE 3;

Figure 6:
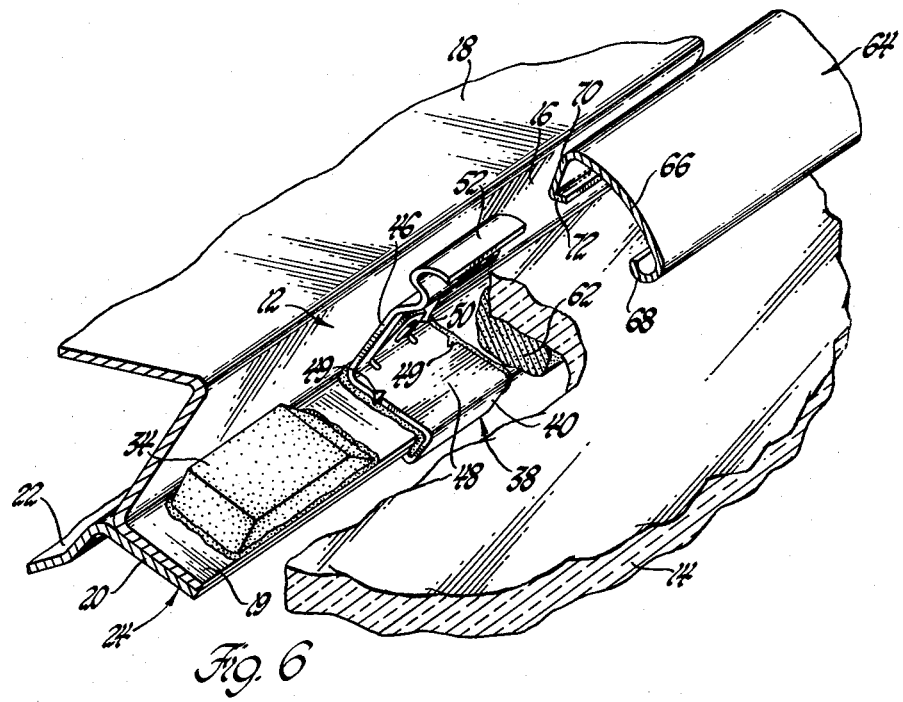
FIGURE 6 is a partially broken away perspective view of the upper portion of the body windshield opening.

Referring now to the drawings, a vehicle body 10 includes a generally continuous body wall 12 defining a windshield opening which is adapted to be closed by a windshield 14. An integral lateral flange 16 of the body roof panel 18 provides the body wall 12 along the upper edge portion of the windshield opening and merges into a laterally extending flange 19 which is joined to a similar flange 20 of the body header 22 to form a pinchweld flange and provide the continuous body flange 24 along the upper edge portion of the windshield opening. Flange 24 extends generally parallel to the plane of the windshield opening defined by wall 12. The body wall 12 and body flange 24 along the side edge portions of the windshield opening are defined by flanges of the body pillars 25 in a conventional manner. Along the lower edge portion of the windshield opening, wall 12 is defined by a lateral flange 26 of the body cowl panel 28. An angle member 30 has one leg 32 thereof secured to the flange 26 of the cowl panel and the other leg thereof extending generally parallel to the plane of the window opening and providing the body flange 24 along the lower edge portion of the windshield opening. Body structure such as hereinbefore described is common in present and past vehicle bodies and although various details of the body parts have not been shown and described, they are known to persons skilled in this art.

As best shown in FIGURES 1, 3 and 6 of the drawings, a plurality of first spacer members 34 are secured to the body flange 24 along the upper and side edge portions of the windshield opening. Members 34 are preferably of rubber or other similar resilient material which is wax-free for adhesive purposes. The members 34 are generally of isosceles trapezoidal cross sectional shape and have their face of largest area adhesively secured to the body flange. In the specific embodiment disclosed herein this adhesive is a neoprene base synthetic rubber adhesive containing suitable fillers and a solvent. Since the body flange 24 has been painted prior to the mounting of the windshield thereon, the adhesive must adhere to various painted surfaces such as an acrylic lacquer surface. As can be seen in FIGURE 1, three members 34 are provided along the upper edge portion of the windshield opening and a single spacer is provided along each side edge portion of the windshield opening.

A plurality of clips 38 are secured to the body flange 24 at various places intermediate the spacer members 34. Each clip includes a generally channel shaped portion 40 which is fitted over the body flange. The free leg 42 of portion 40 has the side edge portions thereof lanced to provide tangs 44 which grip the inner surface of the body flange. Leg 42 also includes a curved free end 45 for ease of installation. A lateral leg 46 extends outwardly along the body wall 12 from the other leg 48 of portion 40 which has the side edge portions thereof lanced to provide tangs 49 which grip the outer surface of the body flange 24. As can be seen in FIGURE 6, an apertured bent tab 50 is lanced out of leg 46 to provide for screw retention of the clips if necessary or desired. Leg 46 terminates in a generally ogee shaped end portion 52 for attachment to the outer body reveal molding as will be hereinafter described.

Prior to installation of the clips 38 on the body flange, the channel shaped portions 40 of the clips are each filled with the same adhesive by which the spacer members 34 are secured to the body. This adhesive forms a skin between the edges of portions 40 of the clips, and this skin is ruptured when the clips are applied to the body flange so that the adhesive material can seal the clips to the body flange when it thereafter cures.

A plurality of generally L-shaped second spacer members 56 have one leg 58 thereof adhesively secured to the body wall 12 and the other leg 60 thereof secured to the body flange 24 along the bottom edge portion of the windshield opening. The leg 60 of the spacer members 58 is of the same cross sectional shape as the spacer members 34. As can be seen from FIGURE 1 of the drawings, three such spacer members are provided along the bottom edge of the windshield opening and these spacer members are adhesively secured to the body flange and to the body wall by the same adhesive which is used for the spacer members 34. Clips 38 are of course installed between members 56 and between members 56 and 34.

Prior to installation of the windshield 14 on the body, it is placed in a suitable jig or fixture and a continuous uninterrupted bead 62 of adhesive material is applied to the inner surface of the windshield adjacent the edge portion thereof as shown in FIGURE 2. The bead of adhesive material is preferably of triangular cross sectional shape as shown. In the embodiment of the invention as shown and described herein, the adhesive material used is commercially available under the tradename of "Weatherban." This material is a polysulfide base material having various fillers and solvents added thereto. It is heat curable, and when cured, exhibits the properties of rubber in that it is capable of accepting shear stress, will not crack or corrode in various climates, and will wet both glass and painted metal.

In order to install the windshield 14 on the body, it is preferably placed in a jig or fixture, which may be the same jig or fixture in which it is placed to apply the bead 62 of adhesive material, and this jig or fixture is then located either by pilot holes in the cowl panel 28 or by the body fixtures or jigs to locate the windshield 14 generally angularly and outwardly of the windshield opening, with the lower edge portion of the windshield 14 resting on the legs 58 of the members 56 and the bead 62 engaging the legs 60 of these members. Thereafter the windshield 14 is rotated inwardly of the windshield opening about its lower edge portion and located therein as the bead 62 of adhesive material comes into contact with the spacer members 34, the legs 48 of the clips 38, and the body flange 24 intermediate the spacer members 34 and 56 and the clips 38. The bead 62 is deformed during the mounting of the windshield 14 within the windshield opening and assumes a cross sectional shape generally as shown in FIGURES 6 and 7.

By having the spacer members 34 of isosceles trapezoidal cross section and by also having the legs 60 of the spacer members 58 of the same cross section, any voids between the ends of the spacer members and the bead 62 of adhesive material are effectively prevented. Further by having the bead 62 of triangular cross sectional shape, the production variations in the body flange 24 are effectively compensated for, so that the windshield 14 may be located within the windshield opening as accurately as possible with respect to the flange 24 and outer edge portion of the body wall. Another advantage obtained by applying the bead 62 to the windshield in the aforementioned cross sectional shape is the fact that the flow of the bead 62 when deformed can be accurately controlled and limited so that none of the material will flow onto the body wall 12. The necessity for this control of the flow of the bead is that the legs 46 of the clips 38 mount the outer reveal molding on the body and these legs should remain free to flex about their juncture with the legs 48 so that the outer body reveal molding can be installed and removed at will. If the flow of the adhesive material is not accurately controlled, it is possible to have this adhesive material fix the legs 46, and also the outer body reveal molding, to wall 12.

After the windshield 14 has been located in place, the jig or fixture can be removed and thereafter the body can be passed through a suitable oven so as to reduce the curing time of the deformed bead 62 of adhesive material to a minimum for production line expediency. While the bead 62 need not be completely cured, it should be cured to the extent that it will have a tack free skin.

Figure 7:
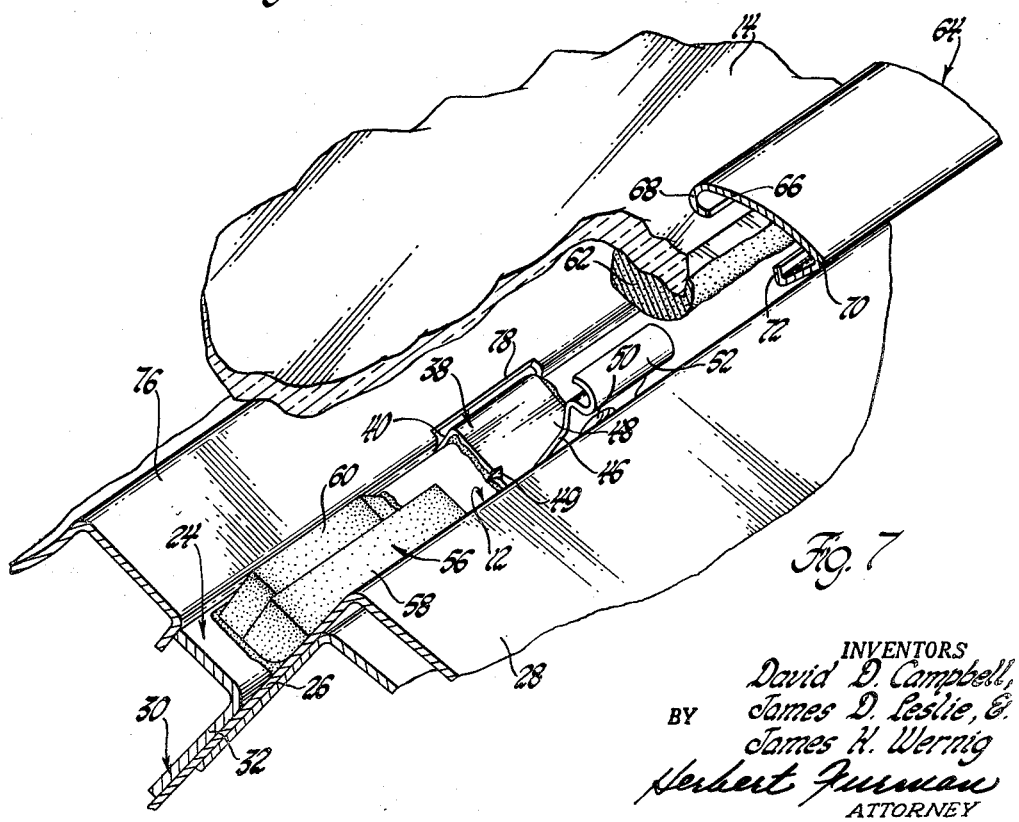
FIGURE 7 is a partially broken away perspective view of the lower portion of the body windshield opening.

The outer body reveal molding 64 is generally of L-shaped cross section, as can be seen in FIGURES 3, 6 and 7. The one leg 66 of the molding is generally of arcuate cross section and terminates in a return bent end 68 which is adapted to bear against the outer surface of the windshield 14 adjacent the edge portion thereof. The other leg 70 of the reveal molding rests on wall 12 and terminates in an angularly directed lateral flange 72 which is adapted to be received within the innermost bead of the ogee shape end 52 of the clip leg 46. Normally, the legs 66 and 70 of the molding are located at a lesser angular relationship than as shown in FIGURES 3, 6 and 7, so that when the molding is installed on the body, by pushing it inwardly until the flange 72 snaps into the beads of the clip legs 46, the leg 66 of the reveal molding will be slightly rotated outwardly by engagement with the windshield 14 to cause this leg to tightly bear against the windshield so that a neat rattle-free relationship between the outer body reveal molding and the windshield is provided. The molding 64 conceals the spacer members, the body wall, the clips, and the body flange, as well as the various adhesive materials from view from the exterior of the body. An inner body garnish molding, indicated at 74 in FIGURES 3 and 7, functions in the same manner along the upper and side edge portions of the windshield opening. Along the lower edge portion of the windshield opening, the body instrument panel 76 may bear against the end of the leg of member 30 which provides flange 24 to function in the same manner as the moldings 64 and 74. The member 76 may be cut out at various places at 78, FIGURE 7, so as to clear the clips 38.

As previously mentioned, the subject manner of mounting panels on vehicle bodies obviates most of the difficulties in sealing the body against the entry of either moisture or other ambient material. Inasmuch as the bead 62 of adhesive material is continuous around the entire windshield opening, it forms a continuous uninterrupted wall or seal between the windshield and the body flange. Further, tests of a vehicle body having the windshield mounted thereon in accordance with this invention have indicated significant increases in body rigidity as well as a substantial decrease in windshield opening distortion due to both bending and torsional moments in comparison to the usual manner in which windshields are commonly mounted on vehicle bodies.

It will also be noted that the subject manner of mounting windshields on vehicle bodies is compatible with present day production matters in that the body structure remains the same and no changes need be made therein.

Once the bead 62 of adhesive material is cured, it forms a continuous bond between the body flange 24 and the windshield 14. This bond does in some respect make the windshield 14 a load carrying part of the body structure, as previously mentioned, but it will also be remembered that the windshield can move to a limited extent within the windshield opening, with the bead 62 acting in shear during this limited movement of the windshield relative to the body structure.

While certain adhesive materials have been mentioned herein, the invention, of course, is not limited to the particular adhesive materials used, and other suitable adhesive materials may be used with equal success. There are, of course, certain limitations such as the adhesive material for the bead 62 must wet both glass and painted metal surfaces and must have some degree of flexibility. The adhesive materials used to secure the spacer members to the body wall and to the body flange may also be varied as long as the adhesive material selected will adequately perform its purpose.

If at any time it is desired or necessary to remove the windshield 14 from the body, this can be accomplished by piercing a hole in the cured bead 62 of adhesive material, inserting a wire through the hole, and then using the wire as a saw to cut through the cured bead 62 of adhesive material around the windshield.

While the invention has been described with particular reference to a vehicle windshield, it is equally adaptable for mounting vehicle backlights on vehicle bodies. It is also adaptable for mounting other fixed vehicle windows on bodies or trucks.

Thus, this invention provides a new and improved manner of mounting transparent panels on vehicle bodies.

What is claimed as new is:

1. A method of installing a transparent panel within a vehicle body opening defined by a generally continuous wall extending laterally to the plane of said opening and merging inwardly of said opening into a flange extending laterally to said first wall and generally parallel to the plane of said opening comprising, adhesively securing a plurality of spacer means to said wall adjacent said flange, applying a continuous bead of adhesive material to the inner surface of said panel adjacent the edge thereof, locating said panel generally angularly outwardly of the plane of said opening with the lower edge portion thereof resting on said spacer means, rotating said panel about the lower edge portion thereof into the plane of said opening and within said wall to bring said bead of adhesive material into contact with said flange, and locating the inner surface of said panel a predetermined distance from said flange while deforming said bead of adhesive material to provide a layer of said adhesive material between the inner surface of said panel and said flange.

2. A method of installing a transparent panel within a vehicle body opening defined by a generally continuous wall extending laterally to the plane of said opening and merging inwardly of said opening into a flange extending laterally to said wall and generally parallel to the plane of said opening comprising, adhesively securing a plurality of first spacer means to said wall adjacent said flange, adhesively securing a plurality of second spacer means to said flange, applying a bead of adhesive material to the inner surface of said panel adjacent the edge thereof, locating said panel generally angularly outwardly of the plane of said opening with the lower edge portion thereof resting on said first spacer means, rotating said panel about the lower edge portion thereof into the plane of said opening and within said wall to bring said bead of adhesive material into contact with said second spacer means and said flange and deform said bead of adhesive material to provide a thin layer of said adhesive material securing the inner surface of said panel adjacent said edge thereof to said second spacer means and a thicker layer of said adhesive material securing the inner surface of said panel adjacent said edge thereof to said flange adjacent said second spacer means.

3. The combination comprising, a vehicle body having a closure opening therein defined by a generally continuous wall extending laterally to the plane of said opening and merging into a generally continuous flange located normal to said wall and generally parallel to the plane of said opening, a panel adapted to close said opening and being of a size substantially equal to the size of said opening, spacer means adhesively secured to the lower edge portion of said wall and to said flange adjacent said wall and engaging the edge of said panel to support said panel within said opening, a bead of adhesive material applied to a surface of said panel adjacent said edge thereof prior to mounting of said panel within said opening, said bead being deformed upon mounting of said panel within said opening to provide a layer of said adhesive material securing said panel surface to said flange adjacent said spacer means, and a molding member having one leg thereof resiliently mounted on said wall to bias another leg thereof into resilient engagement with the outer surface of said panel adjacent said edge portion thereof.

4. The combination comprising, a vehicle body having a closure opening therein defined by a generally continuous wall extending laterally to the plane of said opening and merging into a generally continuous flange located normal to said wall and generally parallel to the plane of said opening, a panel adapted to close said opening and being of a size substantially equal to the size of said opening, spacer means adhesively secured to the lower edge portion of said wall and to said flange adjacent said wall and engaging the edge of said panel to support said panel within said opening, a bead of adhesive material applied to a surface of said panel adjacent said edge thereof prior to mounting of said panel within said opening, said bead being deformed upon mounting of said panel within said opening to provide a layer of said adhesive material securing said panel surface to said flange adjacent said spacer means, molding support members mounted on said body and including molding support portions extending outwardly of the edge of said panel from between the edge of said panel and said wall, and a molding member mounted on said body by said molding support portions and being located opposite to said flange in concealing relationship to said spacer means, said layer of adhesive material, and said molding support members.

5. The combination recited in claim 4 wherein said molding member is engageable with said wall outwardly of said spacer means and is engageable with the outer surface of said panel.

References Cited in the file of this patent
UNITED STATES PATENTS

| | | |
|---|---|---|
| 2,061,760 | Fisher | Nov. 24, 1936 |
| 2,588,628 | Higbie et al. | Mar. 11, 1952 |
| 2,817,559 | Nickles | Dec. 24, 1957 |
| 2,979,788 | Richardson | Apr. 18, 1961 |